(12) United States Patent
Ichioka

(10) Patent No.: US 11,913,838 B2
(45) Date of Patent: Feb. 27, 2024

(54) INSPECTION DEVICE, INKJET PRINTING APPARATUS, AND INSPECTION METHOD

(71) Applicant: SCREEN HOLDINGS CO., LTD., Kyoto (JP)

(72) Inventor: Yoshikazu Ichioka, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 853 days.

(21) Appl. No.: 16/967,372

(22) PCT Filed: Dec. 11, 2018

(86) PCT No.: PCT/JP2018/045467
§ 371 (c)(1),
(2) Date: Aug. 4, 2020

(87) PCT Pub. No.: WO2019/159516
PCT Pub. Date: Aug. 22, 2019

(65) Prior Publication Data
US 2021/0033463 A1 Feb. 4, 2021

(30) Foreign Application Priority Data

Feb. 16, 2018 (JP) ................. 2018-025585

(51) Int. Cl.
*G01J 3/46* (2006.01)
*B41J 2/21* (2006.01)
*B41J 29/393* (2006.01)

(52) U.S. Cl.
CPC . *G01J 3/46* (2013.01); *B41J 2/21* (2013.01); *B41J 29/393* (2013.01)

(58) Field of Classification Search
CPC .... B41J 15/04; B41J 2/16579; B41J 2/16585; B41J 2/21; B41J 2/2117; B41J 2/2142;
(Continued)

(56) References Cited

U.S. PATENT DOCUMENTS 5,790,186 A  8/1998  Tenny et al.
6,456,733 B1  9/2002  Miyauchi et al.
(Continued)

FOREIGN PATENT DOCUMENTS

EP  1 218 192 A2  7/2002
JP  09-290503 A  11/1997
(Continued)

OTHER PUBLICATIONS

Partial Supplementary European Search Report issued in corresponding European Patent Application No. 18906032.0-1017, dated Oct. 28, 2021.
(Continued)

*Primary Examiner* — Omar S Ismail
(74) *Attorney, Agent, or Firm* — Rimon, P.C.

(57) ABSTRACT

There is provided an inspection device, an inkjet printing apparatus, and an inspection method capable of accurately inspecting a printed image printed on a surface of a transparent base material. A first light-emitting unit (61) emits light from one side of a transparent base material (9) toward the transparent base material (9). An imaging unit (63) images the transparent base material (9) from the other side of the transparent base material (9). As described, the first light-emitting unit (61) and the imaging unit (63) are disposed on the opposite sides of the transparent base material (9). As a result, it is possible to suppress generation of the shadow of a printed image itself in a captured image (D1). Therefore, the printed image can be accurately inspected based on the captured image (D1) obtained.

16 Claims, 8 Drawing Sheets

(58) Field of Classification Search
CPC .............. B41J 2/2146; B41J 2029/3935; B41J 2203/01; B41J 29/393; G01J 3/46; G06K 15/023; G06K 15/027
See application file for complete search history.

(56) References Cited

U.S. PATENT DOCUMENTS

| | | | | |
|---|---|---|---|---|
| 2004/0258274 | A1* | 12/2004 | Brundage | G07D 7/207 382/100 |
| 2006/0001880 | A1 | 1/2006 | Stober | |
| 2007/0165208 | A1* | 7/2007 | Cowburn | G09C 1/00 356/71 |
| 2008/0074453 | A1* | 3/2008 | Furukawa | B41J 2/2142 347/14 |
| 2009/0301382 | A1* | 12/2009 | Patel | G01D 3/10 116/201 |
| 2011/0102505 | A1* | 5/2011 | Kagami | B41J 11/0021 347/37 |
| 2011/0109673 | A1* | 5/2011 | Usuda | B41J 29/393 347/9 |
| 2011/0141177 | A1* | 6/2011 | Izuo | B41J 2/2142 347/14 |
| 2012/0069365 | A1* | 3/2012 | Ohama | G01J 1/4223 358/1.12 |
| 2012/0194588 | A1 | 8/2012 | Kasai | |
| 2013/0141484 | A1* | 6/2013 | Kasai | B41J 2/0451 347/14 |
| 2014/0154808 | A1* | 6/2014 | Patel | A61L 2/28 436/1 |
| 2016/0117575 | A1* | 4/2016 | Shimizu | H04N 1/54 358/504 |
| 2017/0232770 | A1* | 8/2017 | Akiyama | B41J 2/155 347/51 |

FOREIGN PATENT DOCUMENTS

| | | |
|---|---|---|
| JP | 11-300938 A | 11/1999 |
| JP | 2004-195722 A | 7/2004 |
| JP | 2004-266449 A | 9/2004 |
| JP | 2006-047078 A | 2/2006 |
| JP | 2006-110952 A | 4/2006 |
| JP | 2008-087287 A | 4/2008 |
| JP | 2010-156620 A | 7/2010 |
| JP | 2012-153088 A | 8/2012 |
| JP | 2013-159047 A | 8/2013 |
| JP | 2014-031023 A | 2/2014 |
| JP | 2015-178190 A | 10/2015 |
| JP | 6010980 B2 | 10/2016 |
| WO | 2017/196301 A1 | 11/2017 |

OTHER PUBLICATIONS

International Search Report issued in corresponding International Patent Application No. PCT/JP2018/045467, dated Feb. 12, 2019, with English translation.

* cited by examiner

INSPECTION DEVICE, INKJET PRINTING APPARATUS, AND INSPECTION METHOD

CROSS REFERENCE TO RELATED APPLICATIONS

This application is the U.S. National Phase under 35 U.S.C. § 371 of International Patent Application No. PCT/JP2018/045467, filed on Dec. 11, 2018, which claims the benefits of Japanese Patent Application No. 2018-025585, filed on Feb. 16, 2018 the entire contents of which are hereby incorporated by reference.

TECHNICAL FIELD

The present invention relates to an inspection device that inspects a printed image printed on a surface of a transparent base material, an inkjet printing apparatus including the inspection device, and an inspection method of inspecting a printed image printed on a surface of a transparent base material.

BACKGROUND ART

Conventionally, there is known an inkjet printing apparatus that prints an image on a transparent base material by ejecting an ink from a head while conveying the transparent base material. This type of inkjet printing apparatus is used, for example, in the process of manufacturing labels for beverage PET bottles and soft packaging materials. Conventional inkjet printing apparatuses that perform printing on a transparent base material are described in Patent Literatures 1 and 2, for example.

CITATION LIST

Patent Literature

Patent Literature 1: JP 6010980 B1
Patent Literature 2: JP 2013-159047 A

SUMMARY OF INVENTION

Technical Problem

In the process of manufacturing labels and soft packaging materials, it is required to inspect whether or not there is a defect in a printed image after the printed image is printed on a transparent base material. Examples of the types of defects include missing of a portion of a printed image due to clogging of a nozzle or the like, misalignment of a printed image with respect to a transparent base material, dirt due to unnecessary dropping of an ink from the nozzle, and adhesion of foreign matter to the transparent base material.

When a printed image on a transparent base material is inspected, conventionally, in a state where a background plate is disposed on one side of the base material, the base material is imaged while light is emitted from the other side of the base material. Then, the defect is detected by comparing the image obtained by imaging with a normal image. However, in this method, the shadow of the printed image itself is generated on the background plate due to light emission. Therefore, it is necessary to suppress sensitivity of the inspection so as to prevent the shadow from being erroneously detected. Therefore, it is difficult to accurately inspect a printed image printed on a surface of a transparent base material.

Furthermore, conventionally, the color of the background plate is white. However, in printing on a transparent base material, there are cases where not only so-called process color inks such as cyan, magenta, yellow, and black and so-called spot-color inks such as purple/violet and green, but also a white ink are used. In a conventional inspection, it is difficult to accurately distinguish the white background plate and an image formed by the white ink. Therefore, it is difficult to accurately inspect a printed image printed on a surface of a transparent base material.

The present invention has been made in view of these circumstances, and an object of the present invention is to provide an inspection device, an inkjet printing apparatus, and an inspection method capable of accurately inspecting a printed image printed on a surface of a transparent base material.

Solution to Problem

A first invention of the present application is an inspection device that inspects a printed image printed on a surface of a transparent base material, the device including a first light-emitting unit configured to emit light from one side of the transparent base material toward the transparent base material, an imaging unit configured to image the transparent base material from another side of the transparent base material, and an inspection processing unit configured to inspect quality of the printed image based on a captured image obtained by the imaging unit.

A second invention of the present application is the inspection device according to the first invention, in which the printed image includes a process-color image that is formed by inks of a plurality of process colors, and a non process-color image that is formed by an ink of a non-process color different from the plurality of process colors and that covers the one side of the process-color image, the inspection device further including a second light-emitting unit configured to emit light from the other side of the transparent base material toward the transparent base material.

A third invention of the present application is the inspection device of the second invention, in which a light amount of at least one of the first light-emitting unit and the second light-emitting unit is capable of being changed.

A fourth invention of the present application is the inspection device of the third invention, the device further including a control unit configured to reduce the light amount of the first light-emitting unit more as an area ratio of the non process-color image is smaller.

A fifth invention of the present application is the inspection device according to any one of the second invention to the fourth invention, in which the plurality of process colors include cyan, magenta, yellow, and black, and the non-process color is white.

A sixth invention of the present application is an inspection device that inspects a printed image printed on a surface of a transparent base material, the printed image including a process-color image that is formed by inks of a plurality of process colors, and a non process-color image that is formed by an ink of a non-process color different from the plurality of process colors and that covers the process-color image, the inspection device including a background plate disposed on one side of the transparent base material, an imaging unit configured to image the transparent base material from another side of the transparent base material, and an inspection processing unit configured to inspect quality of the printed image based on a captured image obtained by the imaging unit, in which the color of the background plate is a color different from any of the plurality of process colors and the non-process color.

A seventh invention of the present application is the inspection device of the sixth invention, in which the color of the background plate is a multi-primary color including two or more color components of the plurality of process colors and the non-process color.

An eighth invention of the present application is the inspection device of the sixth invention or the seventh invention, the device further including a light-emitting unit configured to emit light toward a surface of the background plate on a transparent base material side.

A ninth invention of the present application is the inspection device according to any one of the sixth invention to the eighth invention, in which the plurality of process colors include cyan, magenta, yellow, and black, and the non-process color is white.

A tenth invention of the present application is an inspection device that inspects a printed image printed on a surface of a transparent base material, the device including a background plate disposed on one side of the transparent material, a projection unit configured to emit projected light in a plurality of colors on a surface of the background plate on a transparent base material side while switching the projected light, an imaging unit configured to image the transparent base material from another side of the transparent base material, and an inspection processing unit configured to inspect quality of the printed image based on a captured image obtained by the imaging unit.

An eleventh invention of the present application is an inkjet printing apparatus including the inspection device of any one of the first invention to the tenth invention, the apparatus including a conveyance mechanism configured to convey a transparent base material along a predetermined conveyance path, and a printing unit configured to perform printing by an inkjet method on a surface of the transparent base material that is conveyed by the conveyance mechanism, in which the light-emitting unit and the imaging unit are located downstream of the printing unit in the conveyance path.

A twelfth invention of the present application is an inspection method of inspecting a printed image printed on a surface of a transparent base material, the method including a) a process of, while emitting light from one side of the transparent base material toward the transparent base material, imaging the transparent base material from another side of the transparent base material, and b) a process of inspecting quality of the printed image based on a captured image obtained in the process a).

A thirteenth invention of the present application is an inspection method of inspecting a printed image printed on a surface of a transparent base material, the printed image including a process-color image that is formed by inks of a plurality of process colors, and a non process-color image that is formed by an ink of a non-process color different from the plurality of process colors and that covers the process-color image, the inspection method including a) a process of, in a state where a background plate is disposed on one side of a transparent base material, imaging the transparent base material from another side of the transparent base material, and b) a process of inspecting quality of the printed image based on a captured image obtained in the process a), in which the color of the background plate is a color different from any of the plurality of process colors and the non-process color.

A fourteenth invention of the present application is an inspection method of inspecting a printed image printed on a surface of a transparent base material, the method including a) a process of, in a state where a background plate is disposed on one side of a transparent base material, imaging the transparent base material from another side of the transparent base material, and b) a process of inspecting quality of the printed image based on a captured image obtained in the process a), in which in the process a), projected light in different colors depending on the printed image is emitted on a surface of the background plate on a transparent base material side.

Advantageous Effects of Invention

According to the first to fifth inventions of the present application, the first light-emitting unit and the imaging unit are disposed on opposite sides of the transparent base material. As a result, it is possible to suppress generation of the shadow of the printed image itself in the captured image. Therefore, the printed image can be accurately inspected based on the obtained captured image.

Particularly, according to the second invention of the present application, the process-color image covered with the non process-color image can be satisfactorily imaged with emitted light from the second light-emitting unit.

According to the sixth invention to the ninth invention of the present application, in the captured image, the process-color image and the non process-color image appear clearly and distinguishably from the background plate. Therefore, the printed image can be accurately inspected based on the obtained captured image.

According to the tenth invention of the present application, it is possible to switch the color of the projected light emitted to the background plate depending on the printed image. As a result, the printed image appears satisfactorily in the captured image. Therefore, the printed image can be accurately inspected based on the obtained captured image.

According to the eleventh invention of the present application, an inspection after printing can be accurately performed in the inkjet printing apparatus that performs printing on a transparent base material.

According to the twelfth invention of the present application, while light is emitted from one side of the transparent base material, the transparent base material is imaged from the other side of the transparent base material. As a result, it is possible to suppress generation of the shadow of the printed image itself in the captured image. Therefore, the printed image can be accurately inspected based on the obtained captured image.

According to the thirteenth invention of the present application, in the captured image, the process-color image and the non process-color image appear clearly and distinguishably from the background plate. Therefore, the printed image can be accurately inspected based on the obtained captured image.

According to the fourteenth invention of the present application, projected light in different colors depending on the printed image is emitted on the surface of the background plate on the transparent base material side. As a result, the printed image appears satisfactorily in the captured image. Therefore, the printed image can be accurately inspected based on the obtained captured image.

DESCRIPTION OF EMBODIMENTS

Hereinafter, embodiments of the present invention will be described with reference to the drawings. Note that, below, the direction orthogonal to the conveyance direction of a transparent base material and along the surface of the transparent base material is referred to as a "main scanning direction". Furthermore, the conveyance direction of the transparent base material is referred to as a "sub scanning direction".

1. First Embodiment

<1-1. Configuration of Inkjet Printing Apparatus>

Figure 1:
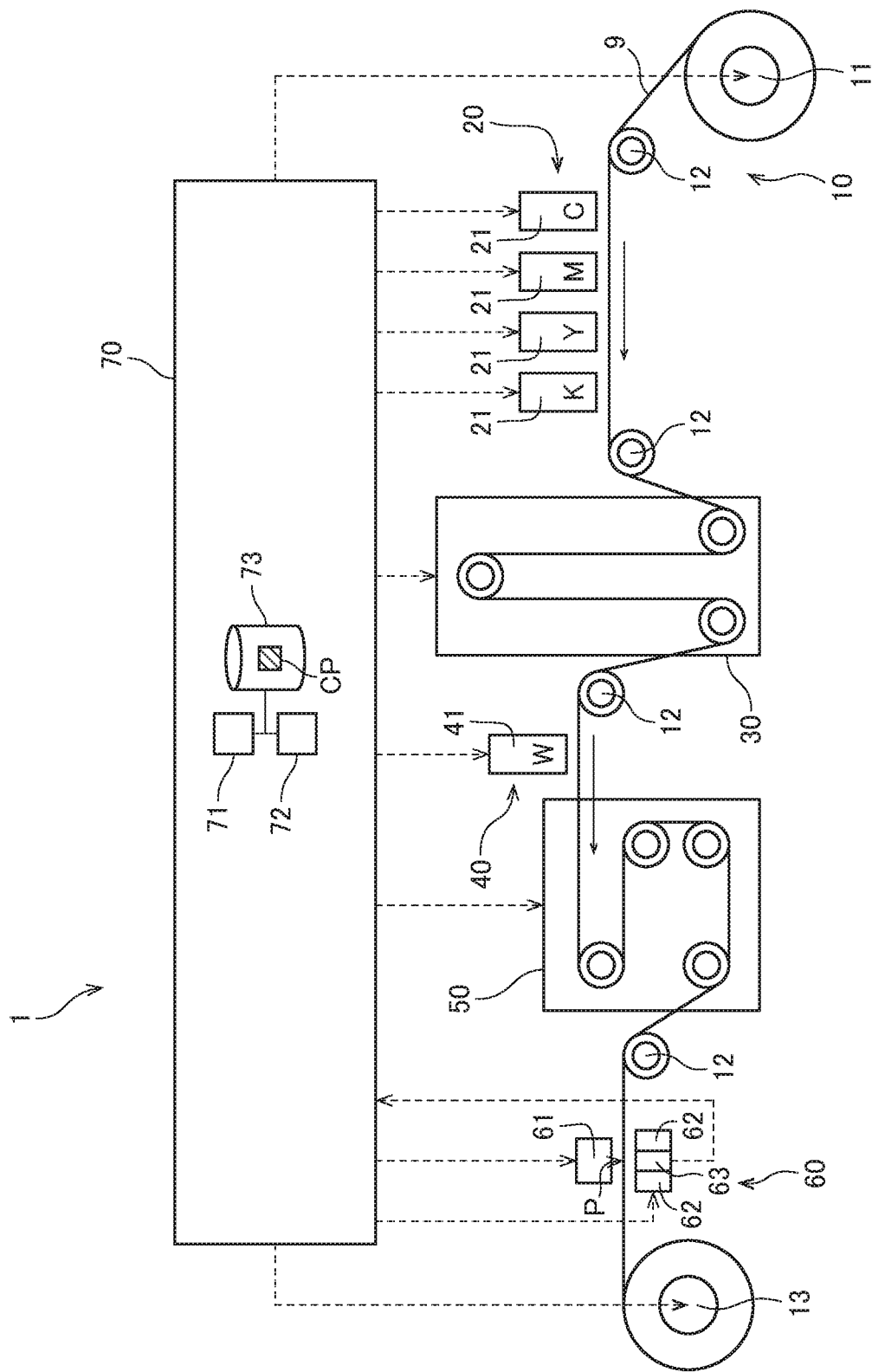
FIG. 1 is a diagram illustrating a configuration of an inkjet printing apparatus.

FIG. 1 is a diagram illustrating a configuration of an inkjet printing apparatus 1 according to a first embodiment of the present invention. The inkjet printing apparatus 1 is an apparatus that prints a multicolor image on a surface of the transparent base material 9 having a long band shape by an inkjet method while conveying the transparent base material 9. As the transparent base material 9, for example, a colorless and transparent resin film is used. The transparent base material 9 after printing is cut into a label for a beverage PET bottle, for example.

As illustrated in FIG. 1, the inkjet printing apparatus 1 includes a conveyance mechanism 10, a first printing unit 20, a first drying unit 30, a second printing unit 40, a second drying unit 50, an image acquisition unit 60, and a control unit 70.

The conveyance mechanism 10 is a mechanism that conveys the transparent base material 9 in the sub scanning direction, which is the longitudinal direction thereof. The conveyance mechanism 10 according to the present embodiment includes an unwinding unit 11, a plurality of conveyance rollers 12, and a winding unit 13. The transparent base material 9 is unwound from the unwinding unit 11 and is conveyed along a conveyance path configured by a plurality of conveyance rollers 12. Each conveyance roller 12 rotates about a horizontal axis to guide the transparent base material 9 to the downstream side of the conveyance path. Furthermore, the transparent base material 9 after having been conveyed is collected by the winding unit 13.

As illustrated in FIG. 1, the transparent base material 9 moves substantially horizontally at the location under the first printing unit 20 and the second printing unit 40. At this time, the print surface of the transparent base material 9 is faced up. The transparent base material 9 is stretched over the plurality of conveyance rollers 12 in a tensioned state. As a result, loosening and a wrinkle of the transparent base material 9 during conveyance are suppressed.

The first printing unit 20 is a processing unit that ejects so-called process color inks onto the transparent base material 9 conveyed by the conveyance mechanism 10. The first printing unit 20 of the present embodiment includes four heads 21. The heads 21 eject ink droplets of cyan, magenta, yellow, and black, which are process colors, onto the print surface of the transparent base material 9, respectively. Each head 21 is fixed to a housing (not illustrated) of the inkjet printing apparatus 1.

Figure 2:
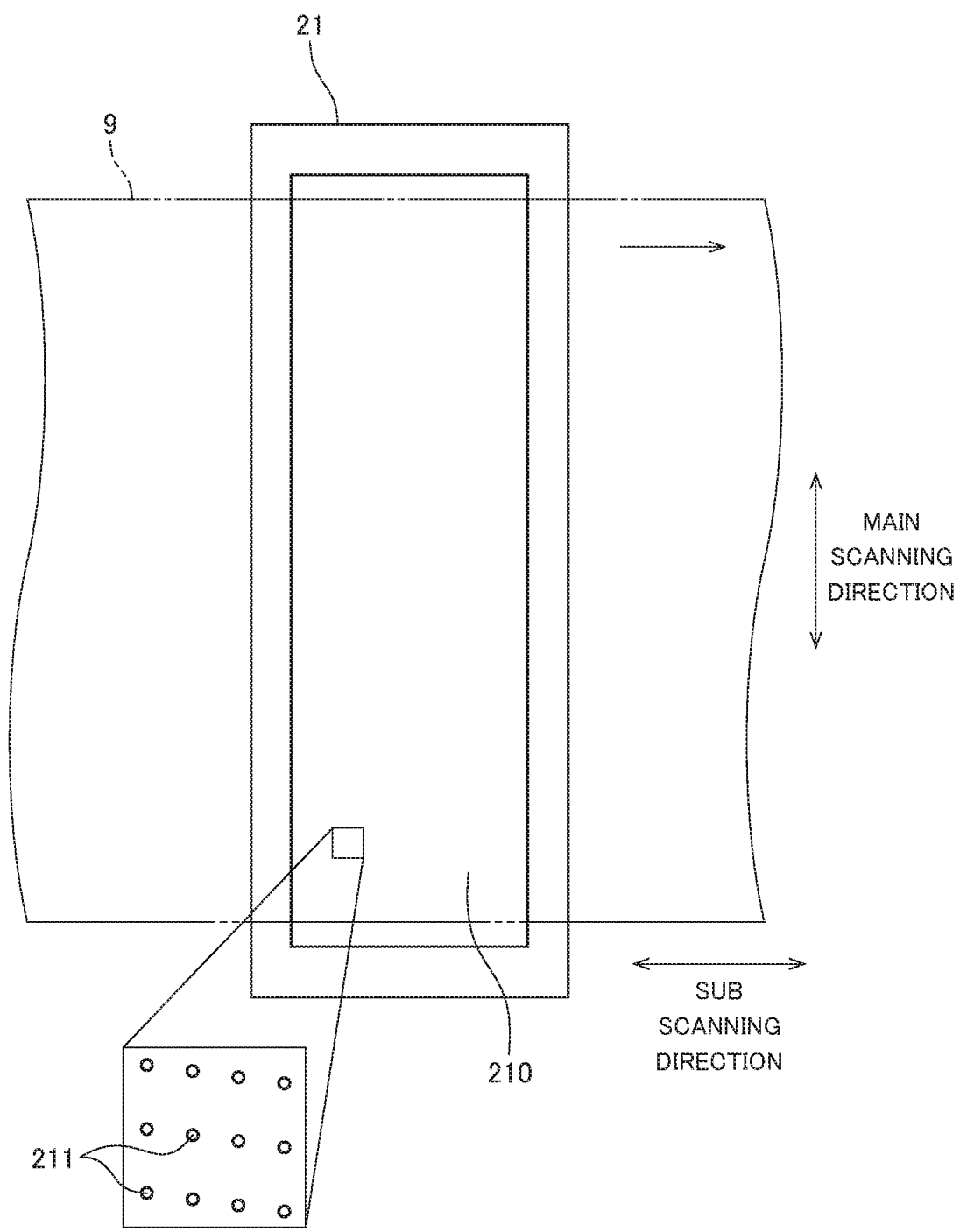
FIG. 2 is a bottom view of a head.

FIG. 2 is a bottom view of the head 21. As illustrated in FIG. 2, an ejection surface 210 for ejecting ink droplets is provided on a lower part of the head 21. The ejection surface 210 covers the entire width of the transparent base material 9 in the main scanning direction. As illustrated in an enlarged manner in FIG. 2, a plurality of nozzles 211 are regularly arranged on the ejection surface 210. The plurality of nozzles 211 is arranged so that their positions in the main scanning direction are different from each other.

At the time of printing, ink droplets are ejected from the plurality of nozzles 211 of each head 21 toward the print surface of the transparent base material 9. That is, ink droplets of cyan, magenta, yellow, and black, which are process colors, are ejected from the plurality of nozzles 211 of the heads 21, respectively. As a result, the four heads 21 print single-color images of cyan, magenta, yellow, and black on the print surface of the transparent base material 9, respectively. Then, a multicolor image is formed on the print surface of the transparent base material 9 by superposing these four single-color images. Hereinafter, the multicolor image printed by the first printing unit 20 is referred to as a "process-color image".

The first drying unit 30 is disposed on the downstream side of the first printing unit 20 in the conveyance path. The first drying unit 30 dries the process color inks ejected from the four heads 21 of the first printing unit 20. As a result, the process color inks are fixed on the print surface of the transparent base material 9. For example, the first drying unit 30 dries the inks by blowing hot air toward the transparent base material 9 to vaporize a solvent in the inks that adheres to the transparent base material 9. However, the first drying unit 30 may dry or cure the inks by another method such as light emission.

The second printing unit 40 is disposed downstream of the first drying unit 30 in the conveyance path. The second printing unit 40 is a processing unit that ejects an ink of a non-process color different from cyan, magenta, yellow, and black described above onto the transparent base material 9 conveyed by the conveyance mechanism 10. The second printing unit 40 of the present embodiment includes one head 41 that ejects ink droplets of white, which is a non-process color. The head 41 is fixed to a housing (not illustrated) of the inkjet printing apparatus 1.

The head 41 of the second printing unit 40 also includes a plurality of nozzles, similarly to the head 21 of the first printing unit 20 described above. The head 41 ejects white ink droplets from a plurality of nozzles toward the print surface of the transparent base material 9. As a result, a white single-color image is printed on the print surface of the transparent base material 9. Hereinafter, a white single-color image printed by the second printing unit 40 is referred to as a "non process-color image".

The second drying unit 50 is disposed downstream of the second printing unit 40 in the conveyance path. The second drying unit 50 dries the non process-color ink ejected from the head 41 of the second printing unit 40. As a result, the non process-color ink is fixed on the print surface of the transparent base material 9. For example, the second drying unit 50 dries the ink by blowing heated gas toward the transparent base material 9 to vaporize a solvent in the ink that adheres to the transparent base material 9. However, the second drying unit 50 may dry or cure the ink by another method such as light emission.

Figure 3:
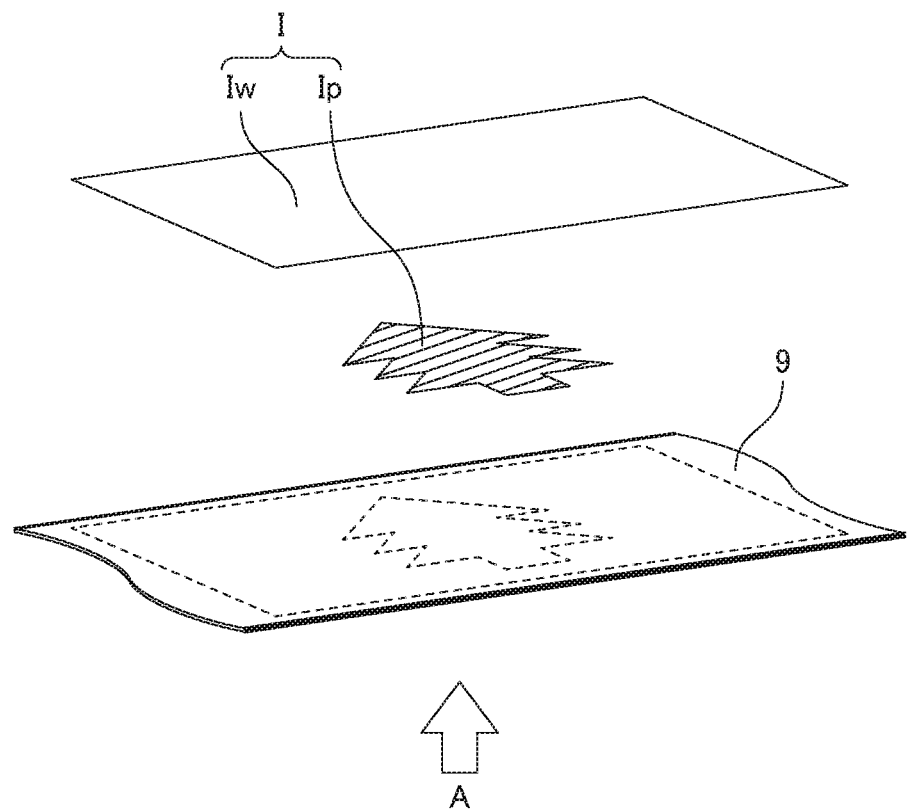
FIG. 3 is a view conceptually illustrating the relationship among a transparent base material, a process-color image, and a non process-color image.
Figure 4:
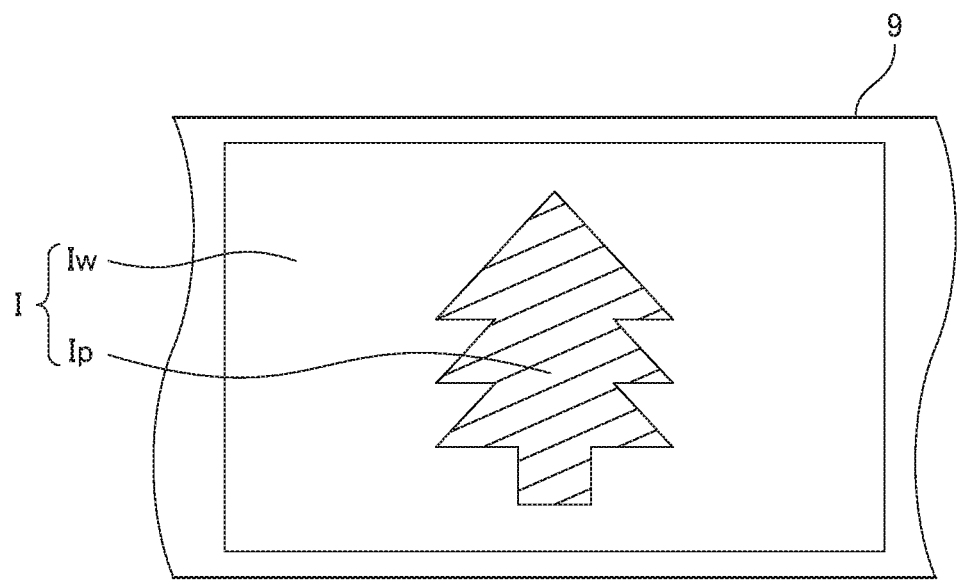
FIG. 4 is a view of the transparent base material after printing as viewed from the non-print surface side.

FIG. 3 is a view conceptually illustrating the relationship among the transparent base material 9, a process-color image Ip, and a non process-color image Iw. FIG. 4 is a view of the transparent base material 9 after printing viewed from the non-print surface side (from the direction of arrow A in FIG. 3). As described above, in the inkjet printing apparatus 1 of the present embodiment, the process-color image Ip is first printed and then the non process-color image Iw is printed on the print surface of the transparent base material 9. Therefore, as illustrated in FIG. 3, at least part of the process-color image Ip is covered with the non process-color image Iw. A printed image I is formed on the print surface of the transparent base material 9 by the process-color image Ip and the non process-color image Iw.

FIG. 1 is referred to again. The image acquisition unit 60 is disposed downstream of the second drying unit 50 in the conveyance path. The image acquisition unit 60 captures the printed image I at a predetermined inspection location P on the conveyance path of the transparent base material 9. As illustrated in FIG. 1, the image acquisition unit 60 includes a first light-emitting unit 61, second light-emitting units 62, and an imaging unit 63. The first light-emitting unit 61 is disposed on one side (print-surface side) of the transparent base material 9. The second light-emitting units 62 and the imaging unit 63 are disposed on the other side (non print-surface side) of the transparent base material 9.

Details of the image acquisition unit 60 will be described later.

The control unit 70 is a means for controlling operation of each unit in the inkjet printing apparatus 1. The control unit 70 of the present embodiment is configured by a computer including a processor 71 such as a CPU, a memory 72 such as a RAM, and a storage unit 73 such as a hard disk drive. As indicated by broken lines in FIG. 1, the control unit 70 is communicably connected to the conveyance mechanism 10, the four heads 21 of the first printing unit 20, the first drying unit 30, the head 41 of the second printing unit 40, the second drying unit 50, the first light-emitting unit 61, the second light-emitting units 62, and the imaging unit 63 described above. The control unit 70 temporarily reads a computer program CP stored in the storage unit 73 into the memory 72, and the processor 71 performs arithmetic processing based on the computer program CP to control operation of each unit described above. As a result, the printing process in the inkjet printing apparatus 1 and an inspection process to be described below advance.

<1-2. Image Acquisition Unit>

Figure 5:
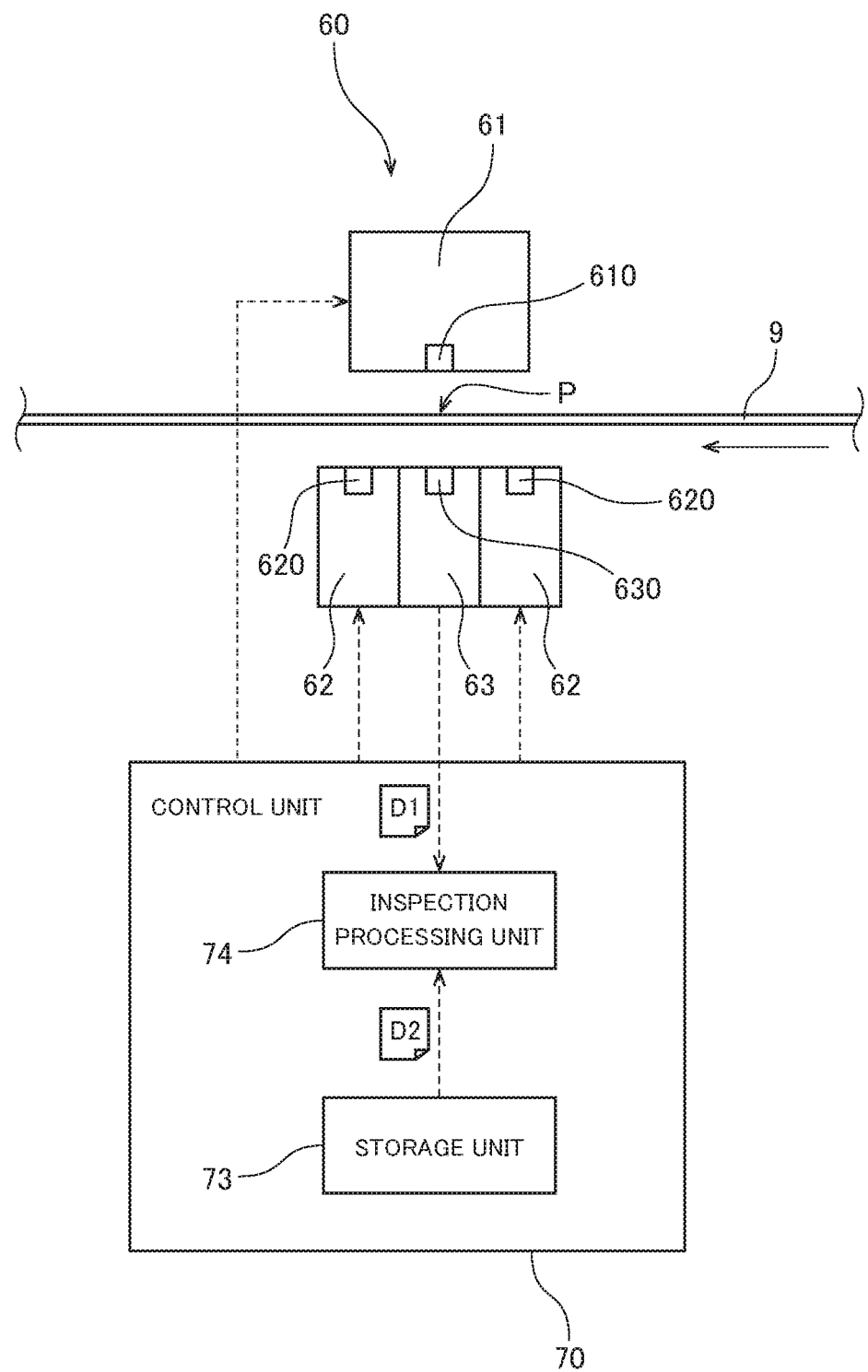
FIG. 5 is a diagram illustrating a configuration of an image acquisition unit.

Subsequently, details of the image acquisition unit 60 will be described later. FIG. 5 is a diagram illustrating a configuration of the image acquisition unit 60. As described above, the image acquisition unit 60 of the present embodiment includes the first light-emitting unit 61, the second light-emitting units 62, and the imaging unit 63.

The first light-emitting unit 61 is located on one side (print-surface side) of the transparent base material 9 at the inspection location P. The first light-emitting unit 61 includes a plurality of light sources 610 arranged in the main scanning direction. As the light source 610, for example, an LED (Light Emitting Diode) is used. When a drive current is supplied to the first light-emitting unit 61 according to a command from the control unit 70, each light source 610 of the first light-emitting unit 61 emits light. As a result, light is emitted from the first light-emitting unit 61 toward the transparent base material 9. Light emitted from the first light-emitting unit 61 is preferably white light.

The second light-emitting units 62 are located on the other side (non print-surface side) of the transparent base material 9 at the inspection location P. In the present embodiment, the second light-emitting units 62 are provided on the upstream side and the downstream side of the imaging unit 63, respectively. However, the second light-emitting units 62 may be installed only on either the upstream side or the downstream side of the imaging unit 63. The second light-emitting unit 62 includes a plurality of light sources 620 arranged in the main scanning direction. As the light source 620, for example, an LED (Light Emitting Diode) is used. When a drive current is supplied to the second light-emitting unit 62 according to a command from the control unit 70, each light source 620 of the second light-emitting unit 62 emits light. As a result, light is emitted from the second light-emitting unit 62 toward the transparent base material 9. Light emitted from the second light-emitting unit 62 is preferably white light.

The light amounts of emitted light from the first light-emitting unit 61 and the second light-emitting unit 62 of the present embodiment can be individually changed. The light amount is set, for example, by the user inputting a desired value to the control unit 70.

The imaging unit 63 is located on the other side (non print-surface side) of the transparent base material 9 at the inspection location P. That is, the first light-emitting unit 61 and the imaging unit 63 are located on the opposite sides of the transparent base material 9 with the inspection location P interposed therebetween. The imaging unit 63 includes a plurality of imaging elements 630 arranged in the main scanning direction. As the imaging element 630, for example, a CCD (Charge-Coupled Device) or a CMOS (Complementary MOS) is used. The imaging unit 63 images the transparent base material 9 passing through the inspection location P by using these imaging elements 630. As a result, the image of the transparent base material 9 passing through the inspection location P is obtained as multi-tone digital data. Hereinafter, an image obtained by the imaging unit 63 is referred to as a "captured image D1". The captured image D1 is output from the imaging unit 63 to the control unit 70.

Furthermore, as conceptually illustrated in FIG. 5, the control unit 70 includes an inspection processing unit 74. The inspection processing unit 74 is a processing unit for inspecting the quality of the printed image I printed on the transparent base material 9 based on the captured image D1 obtained from the imaging unit 63. The function of the inspection processing unit 74 is realized by the computer as the control unit 70 operating according to the computer program CP described above. In the present embodiment, the first light-emitting unit 61, the second light-emitting units 62, the imaging unit 63, and the inspection processing unit 74 constitute an inspection device that inspects the printed image I printed on the surface of the transparent base material 9.

A normal image D2 is stored in advance in the storage unit 73 of the control unit 70. The normal image D2 is an image illustrating a state in which the transparent base material 9 is normally printed. The normal image D2 is generated in the control unit 70 based on print data. The inspection processing unit 74 acquires the captured image D1 from the imaging unit 63 and reads the normal image D2 from the storage unit 73. Then, the captured image D1 and the normal image D2 are compared. As a result, a portion in which the difference between the captured image D1 and the normal image D2 is greater than a preset threshold is detected as a defect.

Examples of the types of defects include missing of a portion of the printed image I due to clogging of some of the nozzles or the like, misalignment of the printed image I on the print surface of the transparent base material 9, dirt due to unnecessary dropping of ink from the nozzle, and adhesion of foreign matter to the transparent base material 9. Whether or not a character or a code included in the printed image I can be normally identified may also be set as one of the inspection items.

Furthermore, in the present embodiment, the normal image D2 used is an image generated based on the print data; however, the normal image D2 is not limited to this. For example, in a case where an identical image is repeatedly printed, a normal image D2 may be generated from an average image of a plurality of captured images D1, or the like. In this case, it is necessary to confirm that an identical defect does not occur in identical spots; however as compared with a case where the normal image D2 is generated based on the print data, it is possible to suppress the labor of color conversion and resolution conversion and to reduce errors caused by processes of color conversion and resolution conversion.

<1-3. Inspection Procedure>

Subsequently, the inspection procedure of the printed image I in the inkjet printing apparatus 1 will be described with reference to the flowchart of FIG. 6. The inkjet printing apparatus 1 repeatedly executes steps S1 to S3 in FIG. 6 while executing the printing process on the transparent base material 9.

First, the image acquisition unit 60 images the transparent base material 9 passing through the inspection location P (step S1). Specifically, the imaging unit 63 images the transparent base material 9 at the inspection location P while light is emitted toward the transparent base material 9 from the first light-emitting unit 61 and the second light-emitting units 62 described above. As a result, the captured image D1 of the transparent base material 9 at the inspection location P is obtained.

At this time, the first light-emitting unit 61 emits light from one side of the transparent base material 9, and the light is incident on the imaging unit 63 located on the other side of the transparent base material 9. That is, the imaging unit 63 receives light emitted from the back of the transparent base material 9. Accordingly, it is possible to suppress generation of the shadow of the printed image I itself in the vicinity of the printed image I by emitted light from the second light-emitting units 62. Therefore, the imaging unit 63 can obtain a clear captured image D1 in which shadow is suppressed. The captured image D1 obtained is output from the imaging unit 63 to the control unit 70.

When the captured image D1 is input to the control unit 70, the inspection processing unit 74 in the control unit 70 compares the captured image D1 with the normal image D2 read from the storage unit 73. Then, it is judged whether or not there is a defective portion having a large difference from the normal image D2 in the captured image D1 (step S2). As a result, the quality of the printed image I formed on the print surface of the transparent base material 9 is inspected. Specifically, it is judged for each pixel whether or not the difference in pixel value between the captured image D1 and the normal image D2 exceeds a preset threshold value, and the pixel with the difference exceeding the threshold value is set as a defective portion.

Thereafter, the control unit 70 outputs the inspection result obtained by the inspection processing unit 74 (step S3). For example, the inspection result is displayed on a display connected to the control unit 70. The user of the inkjet printing apparatus 1 can recognize a defect included in the printed image I by checking the inspection result displayed on the display. However, the control unit 70 does not necessarily have to display the inspection result. The control unit 70 may sequentially accumulate the inspection results in a specific storage area in the storage unit 73.

As described above, in step S1 of the present embodiment, the captured image D1 in which generation of the shadow of the printed image I itself is suppressed is obtained by emitting light from the first light-emitting unit 61. Therefore, in step S2 of the present embodiment, the defect in the printed image I can be accurately inspected based on the obtained captured image D1.

Note that as illustrated in FIG. 3, in a case where a portion of the process-color image Ip is covered with the non process-color image Iw, emitted light from the first light-emitting unit 61 is blocked by the non process-color image Iw, and sufficient light is not emitted to the portion of the process-color image Ip. However, in step S1 of the present embodiment, not only the first light-emitting unit 61 located on one side of the transparent base material 9 but also the second light-emitting units 62 located on the other side of the transparent base material 9 emit light. As a result, sufficient light is emitted also to the portion of the process-color image Ip covered with the non process-color image Iw. Therefore, the imaging unit 63 can image the entire printed image I more clearly. Therefore, in step S2 of the present embodiment, the defect in the printed image I can be inspected more accurately based on the obtained captured image D1.

Furthermore, the light amounts of emitted light from the first light-emitting unit 61 and the second light-emitting unit 62 of the present embodiment can be individually changed. Therefore, the light amounts of the first light-emitting unit 61 and the second light-emitting unit 62 and the balance of the light amounts can be adjusted as desired. As a result, it is possible to prevent a problem such as so-called lens flare due to an inappropriate amount of light from occurring in the captured image D1. Particularly, in a case where the area ratio of the non process-color image Iw is small, lens flare is likely to occur due to emitted light from the first light-emitting unit 61. Therefore, the control unit 70 may automatically reduce the light amount of the first light-emitting unit 61 more as the area ratio of the non process-color image Iw in the printed image I is smaller. Note that the light amount of only one of the first light-emitting unit 61 and the second light-emitting units 62 may be able to be changed.

2. Second Embodiment

Figure 7:
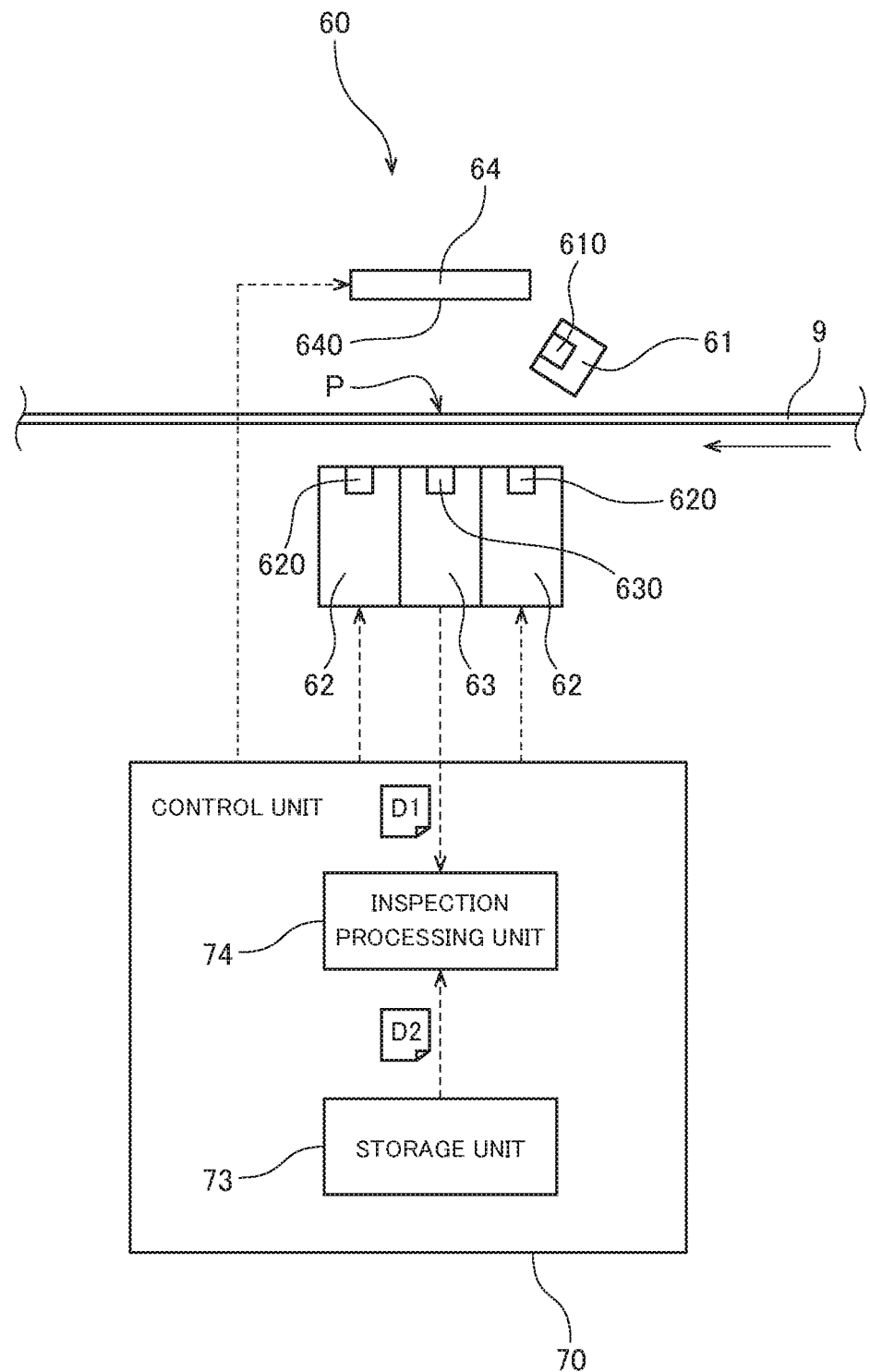
FIG. 7 is a diagram illustrating a configuration of an image acquisition unit according to a second embodiment.

Subsequently, a second embodiment of the present invention will be described. FIG. 7 is a diagram illustrating a configuration of an image acquisition unit 60 according to the second embodiment. As illustrated in FIG. 7, the image acquisition unit 60 of the present embodiment includes a first light-emitting unit 61, second light-emitting units 62, an imaging unit 63, and a background plate 64.

The background plate 64 is located on one side (print-surface side) of a transparent base material 9 at an inspection location P. The background plate 64 has a background surface 640 that extends in parallel to the print surface of the transparent base material 9 and faces the print surface. The background surface 640 covers the entire width of the transparent base material 9 in the main scanning direction. The color of the background surface 640 of the background plate 64 is a color different from any of the colors of inks ejected from heads 21 of a first printing unit 20 (process colors) and the color of ink ejected from a head 41 of a second printing unit 40 (non-process color). For example, the color of the background plate 64 is gray.

The first light-emitting unit 61 is disposed on one side (print-surface side) of the transparent base material 9. The emission direction of light from the first light-emitting unit 61 of the present embodiment is directed not to the transparent base material 9 but to the background plate 64. The first light-emitting unit 61 includes a plurality of light sources 610 arranged in the main scanning direction. As the light source 610, for example, an LED (Light Emitting Diode) is used. When a drive current is supplied to the first light-emitting unit 61 according to a command from the control unit 70, each light source 610 of the first light-emitting unit 61 emits light. As a result, light is emitted from the first light-emitting unit 61 toward the background plate 64. Light emitted from the first light-emitting unit 61 is preferably white light.

Second light-emitting units 62, an imaging unit 63, and an inspection processing unit 74 are equal to those in the above-described first embodiment, and thus overlapping description will be omitted. In the present embodiment, the first light-emitting unit 61, the second light-emitting units 62, the imaging unit 63, the background plate 64, and the inspection processing unit 74 constitute an inspection device that inspects a printed image I printed on the surface of the transparent base material 9.

Figure 6:
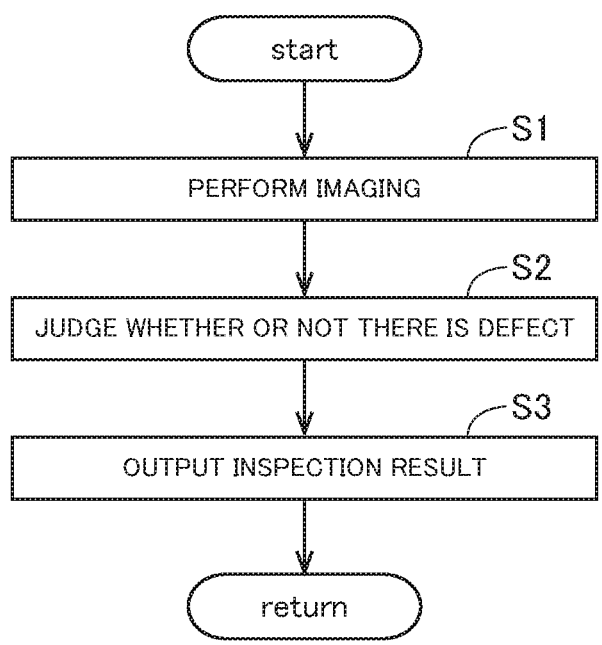
FIG. 6 is a flowchart illustrating a procedure for inspecting a printed image.

Also in the second embodiment, inspection of the printed image I is executed by the procedure similar to the flowchart of FIG. 6. However, in step S1, imaging is performed with the background plate 64 disposed on one side of the transparent base material 9. The first light-emitting unit 61 emits light not to the transparent base material 9 but to the background plate 64. Then, light reflected by the background surface 640 of the background plate 64 passes through the transparent base material 9 and is incident on the imaging unit 63. By emitting light to the background plate 64 as described, generation of a shadow on the background plate 64 is suppressed.

That is, in the present embodiment, in step S1, it is possible to acquire a captured image D1 in which the shadow of the printed image I itself is suppressed by light emitted from the first light-emitting unit 61 and reflected by the background plate 64. Therefore, in step S2 of the present embodiment, the defect in the printed image I can be accurately inspected based on the obtained captured image D1.

The captured image D1 obtained in step S1 includes a portion corresponding to the background surface 640 of the background plate 64 and a portion corresponding to the printed image I located in front of the background surface 640. As described, the color of the background plate 64 is a color different from any of the colors of inks ejected from the heads 21 of the first printing unit 20 (process colors) and the color of ink ejected from the head 41 of the second printing unit 40 (non-process color). Therefore, in the obtained captured image D1, a process-color image Ip and a non process-color image Iw appear clearly distinguishably from the background surface 640. Therefore, the printed image I can be accurately inspected based on the captured image D1.

The color of the background surface 640 of the background plate 64 (hereinafter referred to as a "background color") may be a color corresponding to a multi-primary color including two or more color components of the plurality of process colors and the non-process color. For example, in a case where the background color is gray, it is preferable to use gray corresponding to a multi-primary color including color components of cyan, magenta, and yellow, rather than gray corresponding to low-density black. This is because multi-primary color is less likely to match a color used in the printed image than a single color does.

Figure 8:
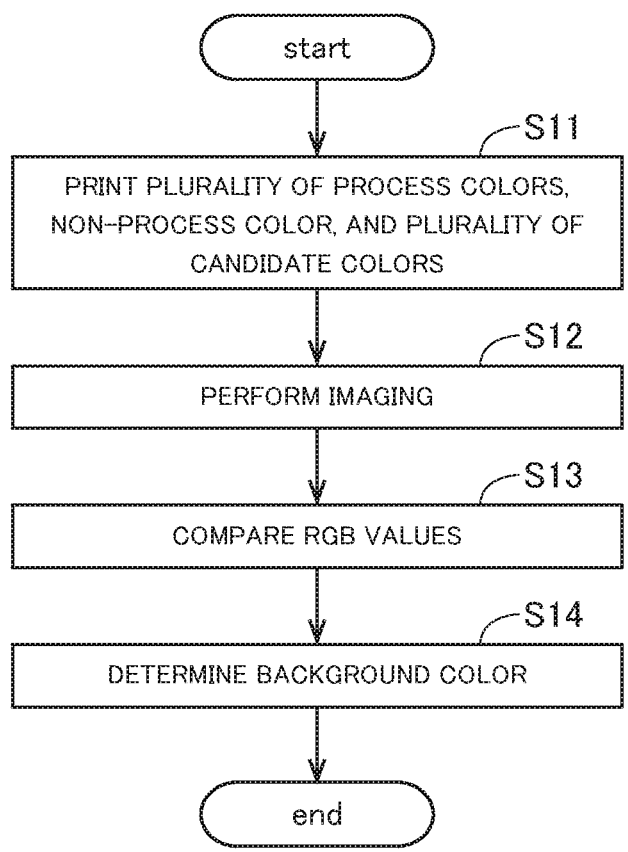
FIG. 8 is a flowchart illustrating an example of a background color determination method.

FIG. 8 is a flowchart illustrating an example of a background color determination method. When the background color is determined, first, a plurality of candidate colors that are candidates for the background color are prepared. Each candidate color is a multi-primary color including two or more color components of the plurality of process colors and the non-process color. As illustrated in FIG. 8, first, the plurality of process colors, the non-process color, and the plurality of candidate colors are printed on the transparent base material 9 (step S11). Next, the process colors, the non-process color, and the plurality of candidate colors that are printed are imaged by the imaging unit 63 (step S12).

Here, the captured image obtained by the imaging unit 63 is data defined not by CMYK but by RGB. That is, the colors in the captured image are represented by combinations of R (red), G (green), and B (blue) values. After the captured image is obtained in step S12, the RGB values of the plurality of process colors and the non-process color are compared with the RGB values of each candidate color (step S13). Then, the candidate color with largest difference in RGB value from the plurality of process colors and the non-process color is determined as the background color (step S14).

By using the background color determined as described, the background surface 640 of the background plate 64 and the printed image I can be more clearly distinguished in the captured image D1. Therefore, the printed image I can be accurately inspected based on the captured image D1.

3. Third Embodiment

Figure 9:
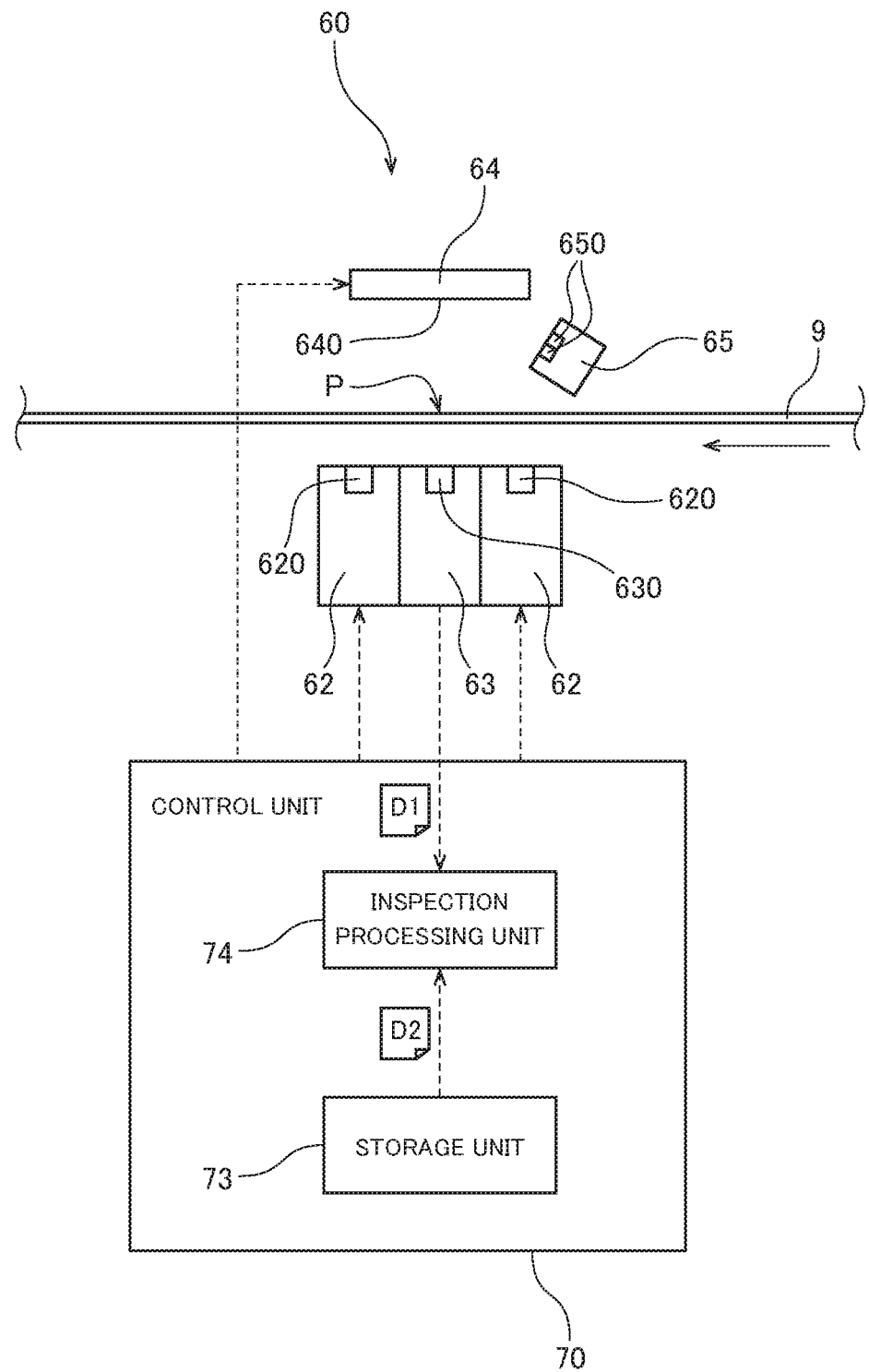
FIG. 9 is a diagram illustrating a configuration of an image acquisition unit according to a third embodiment.

Subsequently, a third embodiment of the present invention will be described. FIG. 9 is a diagram illustrating a configuration of an image acquisition unit 60 according to a third embodiment. As illustrated in FIG. 9, an image acquisition unit 60 of the present embodiment is different from the second embodiment in that the image acquisition unit 60 includes a projection unit 65 in lieu of the first light-emitting unit 61. That is, the image acquisition unit 60 of the present embodiment includes second light-emitting units 62, an imaging unit 63, a background plate 64, and the projection unit 65. The color of a background surface 640 of the background plate 64 in the present embodiment is white.

The projection unit 65 is located on one side (print-surface side) of a transparent base material 9. The projection unit 65 is directed to the background surface 640 of the background plate 64. The projection unit 65 includes a plurality of rows of light sources 650 arranged in the main scanning direction. The light sources 650 in each row emit different colors. As the light source 650, for example, an LED (Light Emitting Diode) is used. The projection unit 65 causes the light sources 650 in any row to emit light in response to a command from the control unit 70. As a result, light in a plurality of colors is selectively emitted from the projection unit 65 toward the background surface 640 of the background plate 64.

The second light-emitting units 62, the imaging unit 63, and an inspection processing unit 74 are equal to those in the above-described first and second embodiments, and thus overlapping description will be omitted. In the present embodiment, the second light-emitting units 62, the imaging unit 63, the background plate 64, the projection unit 65, and the inspection processing unit 74 constitute an inspection device that inspects a printed image I printed on the surface of the transparent base material 9.

Also in the third embodiment, inspection of the printed image I is executed by the procedure similar to the flowchart of FIG. 6. However, in step S1, imaging is performed with the background plate 64 disposed on one side of the transparent base material 9. At this time, the projection unit 65 emits light in a predetermined color to the background plate 64. Then, light reflected by the background surface 640 of the background plate 64 passes through the transparent base material 9 and is incident on the imaging unit 63. By emitting light to the background plate 64 as described, generation of a shadow on the background plate 64 is suppressed.

That is, in the present embodiment, in step S1, it is possible to acquire a captured image D1 in which the shadow of the printed image I itself is suppressed by light emitted from the projection unit 65 and reflected by the background plate 64. Therefore, in step S2 of the present embodiment, the defect in the printed image I can be accurately inspected based on the obtained captured image D1.

The captured image D1 obtained in step S1 includes a portion corresponding to the background surface 640 of the background plate 64 and a portion corresponding to the printed image I located in front of the background surface 640. Here, the color of the light emitted from the projection unit 65 to the background plate 64 is, for example, a color different from any of the colors of inks ejected from heads 21 of a first printing unit 20 (process colors) and the color of ink ejected from a head 41 of a second printing unit 40 (non-process color). Therefore, in the obtained captured image D1, a process-color image Ip and a non process-color image Iw, and the background surface 640 appear clearly distinguishably. Therefore, the printed image I can be accurately inspected based on the captured image D1.

Furthermore, in the present embodiment, the control unit 70 switches the color of light emitted from the projection unit 65 depending on the printed image I. Specifically, the projection unit 65 emits light in a color with the greatest difference in RGB value from the colors included in the printed image I, among the colors of light that can be emitted from the projection unit 65. For example, in the case of a printed image I having a large proportion of green, such as a label for a green tea beverage, light in a red color in contrast to green is emitted. Furthermore, for example, in the case of a printed image I having a large proportion of blue, such as a label for a sports drink, light in an orange color in contrast to blue is emitted. Moreover, in the case of a test chart in which a printed image I is printed for each color of cyan, magenta, yellow, black, and white for nozzle inspection, the color of light emitted from the projection unit 65 may be changed for each color of the test chart. In this way, the printed image I and the background surface 640 can be more clearly distinguished in the captured image D1. Therefore, the printed image I can be inspected more accurately based on the captured image D1.

4. Modification

The first to third embodiments of the present invention have been described above; however, the present invention is not limited to these embodiments.

For example, the second light-emitting units 62 may be omitted in the configuration of the image acquisition unit 60 of the first embodiment. Furthermore, the first light-emitting unit 61 may be omitted in the configuration of the image acquisition unit 60 of the second embodiment. Moreover, the second light-emitting unit 62 may be omitted in the configuration of the image acquisition unit 60 of the second embodiment. Furthermore, the second light-emitting unit 62 may be omitted in the configuration of the image acquisition unit 60 of the third embodiment.

Furthermore, in the configuration of the image acquisition unit 60 of the first embodiment, light emitted from the first light-emitting unit 61 may be light other than white light. For example, the color of light emitted from the first light-emitting unit 61 may be a color different from any of the colors of inks ejected from the heads 21 of the first printing unit 20 (process colors) and the color of ink ejected from the head 41 of the second printing unit 40 (non-process color). Furthermore, the color of light emitted from the first light-emitting unit 61 may be switched depending on the printed image I.

Moreover, in the above embodiments, the first printing unit 20 includes the four heads 21. However, the number of heads 21 included in the first printing unit 20 may be one to three, or may be five or more. For example, heads 21 that eject inks of spot colors such as purple/violet and green in addition to inks of cyan, magenta, yellow, and black may be provided.

Furthermore, in the embodiments described above, printing is performed on the continuous transparent base material 9 having a long strip shape. However, an inkjet printing apparatus of the present invention may perform printing on each of a plurality of transparent base materials while sequentially conveying the plurality of transparent base materials in the sub scanning direction.

Furthermore, the detailed structure of the inspection device and the inkjet printing apparatus may be different from that in each of the drawings of the present application. Moreover, the elements appearing in the embodiments and the modification described above may be appropriately combined as long as no contradiction occurs.

REFERENCE SIGNS LIST 1 inkjet printing apparatus
9 transparent base material
10 conveyance mechanism
20 first printing unit
21 head
30 first drying unit
40 second printing unit
41 head
50 second drying unit
60 image acquisition unit
61 first light-emitting unit
62 second light-emitting unit
63 imaging unit
64 background plate
65 projection unit
70 control unit
74 inspection processing unit
610, 620, 650 light source
630 imaging element
640 background surface
D1 captured image
D2 normal image
I printed image Ip process-color image
Iw non process-color image
P inspection location

The invention claimed is:

1. An inspection device that inspects a printed image printed on a print surface of a transparent base material, the device comprising:
a first light-emitting unit configured to emit light from a print surface side of the transparent base material toward the transparent base material;
an imaging unit configured to image the transparent base material from another side of the transparent base material, the another side being opposite the print surface side;
a second light-emitting unit configured to emit light from the another surface of the transparent base material toward the transparent base material; and
an inspection processing unit configured to inspect quality of the printed image based on a captured image obtained by the imaging unit.

2. The inspection device according to claim 1, wherein the printed image includes
a process-color image that is formed by inks of a plurality of process colors, and
a non process-color image that is formed by an ink of a non-process color different from the plurality of process colors and that covers the print surface side of the process-color image.

3. The inspection device according to claim 2, wherein a light amount of at least one of the first light-emitting unit and the second light-emitting unit is capable of being changed.

4. The inspection device according to claim 3 further comprising a control unit configured to reduce the light amount of the first light-emitting unit more as an area ratio of the non process-color image is smaller.

5. The inspection device according to claim 2, wherein
the plurality of process colors include cyan, magenta, yellow, and black, and
the non-process color is white.

6. An inspection device that inspect a printed image printed on a print surface of a transparent base material,
the printed image including
a process-color image that is formed by inks of a plurality of process colors, and
a non process-color image that is formed by an ink of a non-process color different from the plurality of process colors and that covers the process-color image, the inspection device comprising:
a background plate disposed on a print surface side of the transparent base material, the background plate having a background surface that faces the print surface of the transparent base material;
an imaging unit configured to image the transparent base material from another side of the transparent base material, the another side being opposite the print surface side; and
an inspection processing unit configured to inspect quality of the printed image based on a captured image obtained by the imaging unit, wherein
a color of the background plate is a color different from any of the plurality of process colors and the non-process color.

7. The inspection device according to claim 6, wherein the color of the background plate is a multi-primary color including two or more color components of the plurality of process colors and the non-process color.

8. The inspection device according to claim 6 further comprising a light-emitting unit configured to emit light toward a surface of the background plate on a transparent base material side.

9. The inspection device according to claim 6, wherein
the plurality of process colors include cyan, magenta, yellow, and black, and
the non-process color is white.

10. An inspection device that inspects a printed image printed on a print surface of a transparent base material, the device comprising:
a background plate disposed on a print surface side of the transparent material, the background plate having a background surface that faces the print surface of the transparent base material;
a projection unit configured to emit projected light in a plurality of colors on a surface of the background plate on a transparent base material side while switching the projected light;
an imaging unit configured to image the transparent base material from another side opposite the print surface side of the transparent base material; and
an inspection processing unit configured to inspect quality of the printed image based on a captured image obtained by the imaging unit.

11. An inkjet printing apparatus including the inspection device according to claim 1, the apparatus comprising:
a conveyance mechanism configured to convey a transparent base material along a predetermined conveyance path; and
a printing unit configured to perform printing by an inkjet method on a surface of the transparent base material that is conveyed by the conveyance mechanism,
wherein the first light-emitting unit and the imaging unit are located downstream of the printing unit in the conveyance path.

12. An inspection method of inspecting a printed image printed on a print surface of a transparent base material, the method comprising:
a) a process of, while emitting light from a print surface side of the transparent base material toward the transparent base material and emitting light from another side opposite the print surface side of the transparent base material toward the transparent base material, imaging the transparent base material from the another side of the transparent base material; and
b) a process of inspecting quality of the printed image based on a captured image obtained in the process a).

13. An inspection method of inspecting a printed image printed on a print surface of a transparent base material,
the printed image including
a process-color image that is formed by inks of a plurality of process colors, and
a non process-color image that is formed by an ink of a non-process color different from the plurality of process colors and that covers the process-color image, the method comprising:
a) a process of, in a state where a background plate having a background surface that faces the print surface of the transparent base material is disposed on a print surface side of the transparent base material, imaging the transparent base material from another side opposite the print surface side of the transparent base material; and
b) a process of inspecting quality of the printed image based on a captured image obtained in the process a), wherein a color of the background plate is a color different from any of the plurality of process colors and the non-process color.

14. An inspection method of inspecting a printed image printed on a print surface of a transparent base material, the method comprising:
   a) a process of, in a state where a background plate having a background surface that faces the print surface of the transparent base material is disposed on a print surface side of the transparent base material, imaging the transparent base material from another side opposite the print surface side of the transparent base material; and
   b) a process of inspecting quality of the printed image based on a captured image obtained in the process a), wherein
   in the process a), projected light in different colors depending on the printed image is emitted on a surface of the background plate on a transparent base material side.

15. An inkjet printing apparatus including the inspection device according to claim 6, the apparatus comprising:
   a conveyance mechanism configured to convey a transparent base material along a predetermined conveyance path; and
   a printing unit configured to perform printing by an inkjet method on a surface of the transparent base material that is conveyed by the conveyance mechanism,
   wherein the background plate and the imaging unit are located downstream of the printing unit in the conveyance path.

16. An inkjet printing apparatus including the inspection device according to claim 10, the apparatus comprising:
   a conveyance mechanism configured to convey a transparent base material along a predetermined conveyance path; and
   a printing unit configured to perform printing by an inkjet method on a surface of the transparent base material that is conveyed by the conveyance mechanism,
   wherein the background plate, the projection unit and the imaging unit are located downstream of the printing unit in the conveyance path.

* * * * *